United States Patent
Naohara et al.

(10) Patent No.: US 11,099,105 B2
(45) Date of Patent: Aug. 24, 2021

(54) DATA PROCESSING METHOD, DATA PROCESSING DEVICE, AND NON-TRANSITORY COMPUTER-READABLE RECORDING MEDIUM HAVING RECORDED THEREON DATA PROCESSING PROGRAM

(71) Applicant: SCREEN Holdings Co., Ltd., Kyoto (JP)

(72) Inventors: Hideji Naohara, Kyoto (JP); Mayumi Yamamoto, Kyoto (JP)

(73) Assignee: SCREEN Holdings Co., Ltd.

( * ) Notice: Subject to any disclaimer, the term of this patent is extended or adjusted under 35 U.S.C. 154(b) by 282 days.

(21) Appl. No.: 16/261,646

(22) Filed: Jan. 30, 2019

(65) Prior Publication Data

US 2019/0242789 A1 Aug. 8, 2019

(30) Foreign Application Priority Data

Feb. 8, 2018 (JP) .............................. JP2018-020796

(51) Int. Cl.
*G06F 11/30* (2006.01)
*G01M 99/00* (2011.01)

(52) U.S. Cl.
CPC ................................. *G01M 99/005* (2013.01)

(58) Field of Classification Search
CPC .................................................. G01M 99/005
See application file for complete search history.

(56) References Cited

U.S. PATENT DOCUMENTS

2019/0005433 A1 1/2019 Sekine

FOREIGN PATENT DOCUMENTS

| JP | 2004186445 | * | 4/2004 |
|---|---|---|---|
| JP | 2004-186445 A | | 7/2004 |
| JP | 2012-150721 A | | 8/2012 |
| JP | 2012150721 | * | 8/2012 |
| JP | 6076571 B1 | | 2/2017 |
| TW | 200502980 A | | 1/2005 |
| WO | WO 2004/105044 A1 | | 12/2004 |

* cited by examiner

*Primary Examiner* — Phuong Huynh
(74) *Attorney, Agent, or Firm* — Ostrolenk Faber LLP

(57) ABSTRACT

A data processing method includes a period setting step of obtaining a rising period, a stable period, and a falling period with respect to time series data obtained in a substrate processing apparatus, an evaluation value calculation step of obtaining an evaluation value in the rising period, an evaluation value in the stable period, and an evaluation value in the falling period as an evaluation value of the time series data. In the period setting step, a period from when a control signal changes until the time series data falls within a first range including a target level is obtained as the rising period, a period from when the control signal changes until the time series data falls within a second range including an initial level is obtained as the falling period, and a period between the rising period and the falling period is obtained as the stable period.

20 Claims, 10 Drawing Sheets

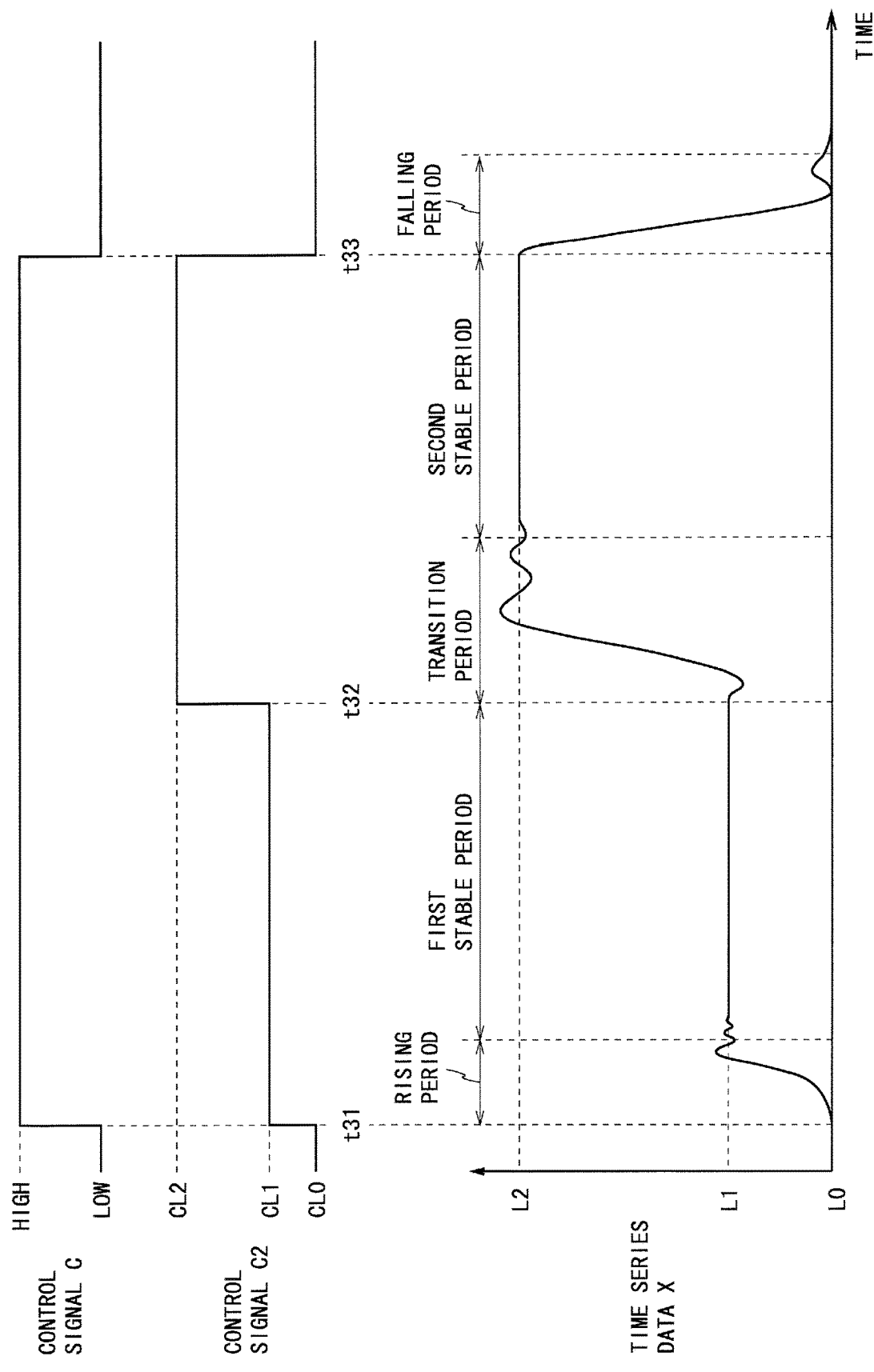

DATA PROCESSING METHOD, DATA PROCESSING DEVICE, AND NON-TRANSITORY COMPUTER-READABLE RECORDING MEDIUM HAVING RECORDED THEREON DATA PROCESSING PROGRAM

BACKGROUND OF THE INVENTION

Field of the Invention

The present invention relates to digital data processing, especially to a processing method, a processing device, and a processing program of data measured in a substrate processing apparatus.

Description of Related Art

As a method for detecting an abnormality in a device or an apparatus, there is known a method in which physical quantities (for example, length, angle, time, speed, force, pressure, voltage, current, temperature, flow) showing operating status of the device or the apparatus are measured using sensors or the like, and time series data obtained by arranging measurement results in a time-series order is analyzed. When the device or the apparatus performs a same operation under a same condition, the time series data changes similarly if there are no abnormalities. Therefore, it is possible to detect abnormal time series data by mutually comparing a plurality of pieces of time series data which is expected to change similarly and specify an occurring position and a cause of the abnormality by analyzing the abnormal time series data.

In a manufacturing process of a semiconductor substrate (hereinafter referred to as a substrate), a series of processing is performed using a plurality of substrate processing apparatuses. The substrate processing apparatus includes a plurality of processing units for performing, on the substrate, specific processing in the series of processing. Each processing unit performs the processing on the substrate in accordance with a predetermined procedure (called a recipe). At this time, time series data is obtained based on measurement results in each processing unit. It is possible to specify the processing unit in which the abnormality occurs and the cause of the abnormality by analyzing the obtained time series data.

Related to the invention of the present application, Japanese Laid-Open Patent Publication No. 2012-150721 discloses an abnormality diagnosis method including a step of determining whether time series data satisfies a plurality of determination conditions and generating determination data consisting of a combination of determination results, and a step of estimating a cause of an abnormality by comparing model data obtained considering a change trend which occurs for each cause of the abnormality and the determination data.

However, by a conventional method for analyzing the time series data obtained in the substrate processing apparatus, it may not be possible to discriminate accurately whether a substrate is processed normally in the substrate processing apparatus. For example, a substrate which is determined to be processed normally may not operate correctly in fact, or in contrast, a substrate which is determined that an abnormality occurs in the processing may operate correctly in fact.

SUMMARY OF THE INVENTION

Therefore, an object of the present invention is to provide a data processing method capable of discriminating accurately whether a substrate is processed normally in a substrate processing apparatus.

According to a first aspect of the present invention, there is provided a data processing method for processing time series data obtained in a substrate processing apparatus, the method including: a period setting step of obtaining, with respect to the time series data, a rising period in which the time series data changes from an initial level to a target level, a stable period in which the time series data keeps the target level, and a falling period in which the time series data changes from the target level to the initial level; and an evaluation value calculation step of obtaining an evaluation value of the time series data, wherein in the evaluation value calculation step, an evaluation value in the rising period, an evaluation value in the stable period, and an evaluation value in the falling period are obtained as the evaluation value of the time series data.

According to a second aspect of the present invention, in the first aspect of the present invention, the time series data changes depending on a control signal in the substrate processing apparatus, and in the period setting step, a period from when the control signal changes until the time series data falls within a first range including the target level is obtained as the rising period, a period from when the control signal changes until the time series data falls within a second range including the initial level is obtained as the falling period, and a period between the rising period and the falling period is obtained as the stable period.

According to a third aspect of the present invention, in the second aspect of the present invention, in the evaluation value calculation step, a length of the rising period is obtained as the evaluation value in the rising period, and a length of the falling period is obtained as the evaluation value in the falling period.

According to a fourth aspect of the present invention, in the second aspect of the present invention, in the evaluation value calculation step, an overshoot amount of the time series data is obtained as the evaluation value in the rising period.

According to a fifth aspect of the present invention, in the second aspect of the present invention, in the evaluation value calculation step, a statistical value of the time series data in the stable period is obtained as the evaluation value in the stable period.

According to a sixth aspect of the present invention, in the second aspect of the present invention, in the evaluation value calculation step, the evaluation value of the time series data is obtained by comparing the time series data with reference data.

According to a seventh aspect of the present invention, in the sixth aspect of the present invention, in the evaluation value calculation step, the time series data is compared with the reference data after matching timing at which data starts to change first between the time series data and the reference data.

According to an eighth aspect of the present invention, in the sixth aspect of the present invention, the reference data is another time series data.

According to a ninth aspect of the present invention, in the sixth aspect of the present invention, in the evaluation value calculation step, processing for moving one of the time series data and the reference data in a time axis direction by a predetermined amount and comparing the time series data with the reference data is performed a plurality of times, and a minimum value of a plurality of obtained evaluation values is obtained as the evaluation value of the time series data.

According to a tenth aspect of the present invention, in the second aspect of the present invention, when the time series data has a plurality of target levels, in the period setting step, a transition period in which the time series data changes from an old target level to a new target level is further obtained, and in the evaluation value calculation step, an evaluation value in the transition period is further obtained as the evaluation value of the time series data.

According to an eleventh aspect of the present invention, there is provided a data processing device for processing time series data obtained in a substrate processing apparatus, the device including: a period setting section configured to obtain, with respect to the time series data, a rising period in which the time series data changes from an initial level to a target level, a stable period in which the time series data keeps the target level, and a falling period in which the time series data changes from the target level to the initial level; and an evaluation value calculation section configured to obtain an evaluation value of the time series data, wherein the evaluation value calculation section obtains an evaluation value in the rising period, an evaluation value in the stable period, and an evaluation value in the falling period as the evaluation value of the time series data.

According to a twelfth aspect of the present invention, in the eleventh aspect of the present invention, the time series data changes depending on a control signal in the substrate processing apparatus, and the period setting section obtains a period from when the control signal changes until the time series data falls within a first range including the target level as the rising period, obtains a period from when the control signal changes until the time series data falls within a second range including the initial level as the falling period, and obtains a period between the rising period and the falling period as the stable period.

According to a thirteenth aspect of the present invention, in the twelfth aspect of the present invention, the evaluation value calculation section obtains a length of the rising period as the evaluation value in the rising period, and obtains a length of the falling period as the evaluation value in the falling period.

According to a fourteenth aspect of the present invention, in the twelfth aspect of the present invention, the evaluation value calculation section obtains an overshoot amount of the time series data as the evaluation value in the rising period.

According to a fifteenth aspect of the present invention, in the twelfth aspect of the present invention, the evaluation value calculation section obtains a statistical value of the time series data in the stable period as the evaluation value in the stable period.

According to a sixteenth aspect of the present invention, in the twelfth aspect of the present invention, the evaluation value calculation section obtains the evaluation value of the time series data by comparing the time series data with reference data.

According to a seventeenth aspect of the present invention, in the sixteenth aspect of the present invention, the evaluation value calculation section compares the time series data with the reference data after matching timing at which data starts to change first between the time series data and the reference data.

According to an eighteenth aspect of the present invention, in the sixteenth aspect of the present invention, the evaluation value calculation section performs, a plurality of times, processing for moving one of the time series data and the reference data in a time axis direction by a predetermined amount and comparing the time series data with the reference data, and obtains a minimum value of a plurality of obtained evaluation values as the evaluation value of the time series data.

According to a nineteenth aspect of the present invention, in the twelfth aspect of the present invention, when the time series data has a plurality of target levels, the period setting section further obtains a transition period in which the time series data changes from an old target level to a new target level, and the evaluation value calculation section further obtains an evaluation value in the transition period as the evaluation value of the time series data.

According to a twentieth aspect of the present invention, there is provided a computer-readable recording medium having recorded thereon a data processing program for processing time series data obtained in a substrate processing apparatus, the data processing program causing a computer to execute a method by a CPU using a memory, the method including: a period setting step of obtaining, with respect to the time series data, a rising period in which the time series data changes from an initial level to a target level, a stable period in which the time series data keeps the target level, and a falling period in which the time series data changes from the target level to the initial level; and an evaluation value calculation step of obtaining an evaluation value of the time series data, wherein in the evaluation value calculation step, an evaluation value in the rising period, an evaluation value in the stable period, and an evaluation value in the falling period are obtained as the evaluation value of the time series data.

According to the first, eleventh, or twentieth aspect, the rising period, the stable period, and the falling period are obtained with respect to the time series data, and the evaluation values in the three periods are obtained as the evaluation value of the time series data. Therefore, whether a substrate is processed normally in the substrate processing apparatus can be discriminated accurately based on the three kinds of evaluation values.

According to the second or twelfth aspect, the rising period, the stable period, and the falling period can be determined suitably and whether the substrate is processed normally in the substrate processing apparatus can be discriminated accurately based on the three kinds of evaluation values.

According to the third or thirteenth aspect, whether the substrate is processed normally in the substrate processing apparatus can be discriminated accurately by using the length of the rising period and the length of the falling period as the evaluation value.

According to the fourth or fourteenth aspect, whether the substrate is processed normally in the substrate processing apparatus can be discriminated accurately by using the overshoot amount of the time series data as the evaluation value.

According to the fifth or fifteenth aspect, whether the substrate is processed normally in the substrate processing apparatus can be discriminated accurately by using the statistical value of the time series data in the stable period as the evaluation value.

According to the sixth or sixteenth aspect, an evaluation value suitable for the time series data can be obtained by comparing the time series data with the reference data.

According to the seventh or seventeenth aspect, a more suitable evaluation value for the time series data can be obtained by comparing the time series data with the reference data after matching timing at which data starts to change first.

According to the eighth aspect, an evaluation value suitable for the time series data can be obtained by using the other time series data as the reference data.

According to the ninth or eighteenth aspect, a more suitable evaluation value for the time series data can be obtained by comparing the time series data with the reference data with moving one of the data in the time axis direction.

According to the tenth or nineteenth aspect, when the time series data has the plurality of target levels, whether the substrate is processed normally in the substrate processing apparatus can be discriminated accurately by obtaining the evaluation value in the transition period in addition to the three kinds of evaluation values.

These and other objects, features, modes and effects of the present invention will be more apparent from the following detailed description with reference to the attached drawings.

BRIEF DESCRIPTION OF THE DRAWINGS

FIG. 13 is a diagram showing period setting in a data processing device according to a fourth embodiment of the present invention.

DETAILED DESCRIPTION OF THE INVENTION

In the following, a data processing method, a data processing device, and a data processing program according to embodiments of the present invention are described with reference to the drawings. The data processing method according to the present embodiment is typically performed using a computer. The data processing program according to the present embodiment is a program for performing the data processing method using a computer. The data processing device according to the present embodiment is typically configured using a computer. The computer executing the data processing program functions as the data processing device.

First Embodiment

Figure 1:
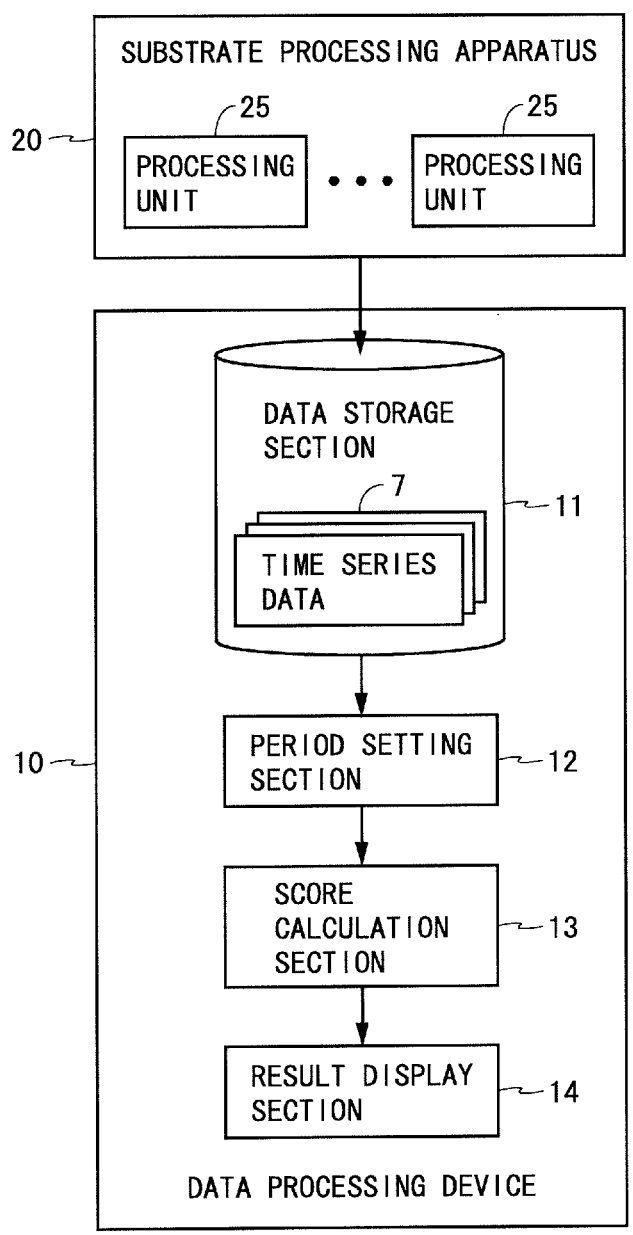
FIG. 1 is a block diagram showing a configuration of a data processing device according to a first embodiment of the present invention.

FIG. 1 is a block diagram showing a configuration of a data processing device according to a first embodiment of the present invention. A data processing device 10 shown in FIG. 1 includes a data storage section 11, a period setting section 12, a score calculation section 13, and a result display section 14. The data processing device 10 is used being connected to a substrate processing apparatus 20.

The substrate processing apparatus 20 includes a plurality of processing units 25, and a plurality of physical quantities (for example, length, angle, time, speed, force, pressure, voltage, current, temperature, flow) showing operating status of the processing unit 25 is measured in each processing unit 25. With this, a plurality of pieces of time series data 7 is obtained. The data storage section stores the time series data 7 obtained by the above-described method.

The period setting section 12 obtains a rising period, a stable period, and a falling period with respect to the time series data 7 read from the data storage section 11. The score calculation section 13 obtains an evaluation value (hereinafter referred to as a score) of the time series data 7 with respect to which three periods are obtained in the period setting section 12. The score calculation section 13 obtains an evaluation value in the rising period, an evaluation value in the stable period, and an evaluation value in the falling period as the evaluation value of the time series data 7. The score calculation section 13 functions as an evaluation value calculation section. The result display section 14 displays a screen based on the score obtained by the score calculation section 13.

Figure 2:
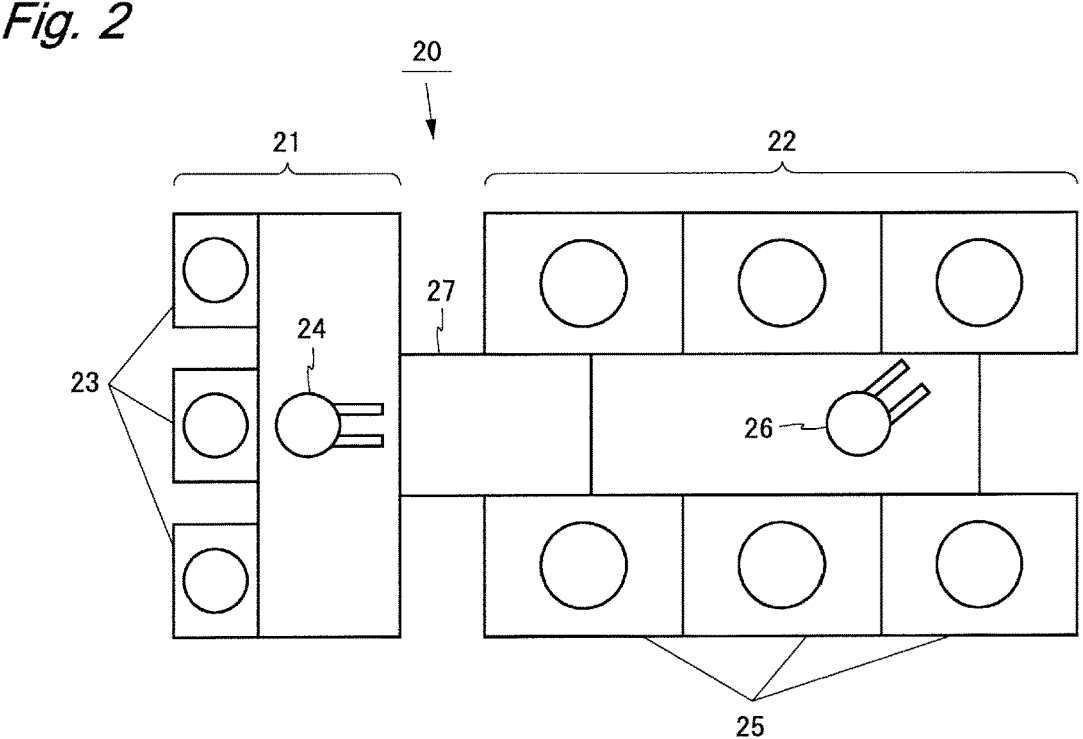
FIG. 2 is a diagram showing a schematic configuration of a substrate processing apparatus shown in FIG. 1.

FIG. 2 is a diagram showing a schematic configuration of the substrate processing apparatus 20. The substrate processing apparatus 20 includes an indexer section 21 and a processing section 22. The indexer section 21 includes a plurality of cassette holding sections 23 and an indexer robot 24. The processing section 22 includes a plurality of processing units 25 and a substrate transfer robot 26. A cassette (not shown) including a plurality of substrates is set to the cassette holding section 23. The indexer robot 24 performs an operation for taking out a substrate from the cassette and an operation for putting the substrate into the cassette. The processing unit 25 has rooms (hereinafter referred to as chambers) for performing processing on the substrate. The chamber corresponds one to one with the processing unit 25. For example, processing of cleaning the substrate using processing liquid is performed in the chamber. The substrate transfer robot 26 performs an operation for carrying the substrate in the processing unit 25 and an operation for carrying the substrate out of the processing unit 25. The number of the processing units 25 is twenty-four, for example. In this case, for example, tower structures each including four stacked processing units 25 are provided at six positions around the substrate transfer robot 26.

The indexer robot 24 takes out a processing-target substrate from the cassette set to the cassette holding section 23, and passes the taken-out substrate to the substrate transfer robot 26 via a substrate receiving/transferring section 27. The substrate transfer robot 26 carries the substrate received from the indexer robot 24 in a target processing unit 25. After the processing on the substrate is completed, the substrate transfer robot 26 takes out the substrate from the target processing unit 25, and passes the taken-out substrate to the indexer robot 24 via the substrate receiving/transferring section 27. The indexer robot 24 puts the substrate received from the substrate transfer robot 26 into a target cassette. Control of the indexer section 21 and the processing section 22 is performed by a control section (not shown) of the substrate processing apparatus 20.

Figure 3:
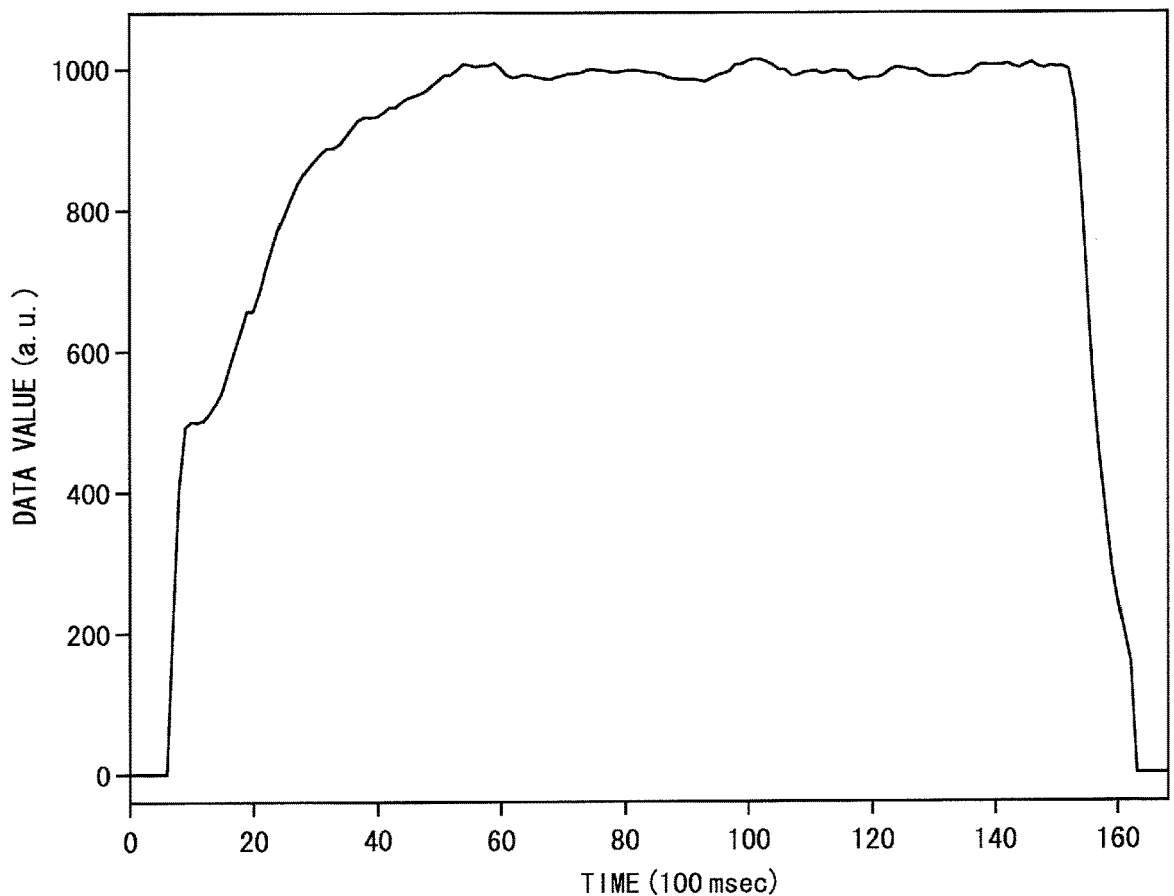
FIG. 3 is a diagram showing a graph of time series data in the data processing device shown in FIG. 1.

Hereinafter, processing performed by the processing unit 25 on one substrate is referred to as a "unit processing". During execution of the unit processing, a plurality of physical quantities is measured in the processing unit 25 using sensors or the like. A plurality of pieces of time series data 7 is obtained based on measurement results of the plurality of physical quantities. The obtained plurality of pieces of time series data 7 is stored in the data storage section 11. When the time series data 7 is shown in a graph form, a graph shown in FIG. 3 is obtained, for example.

Figure 4:
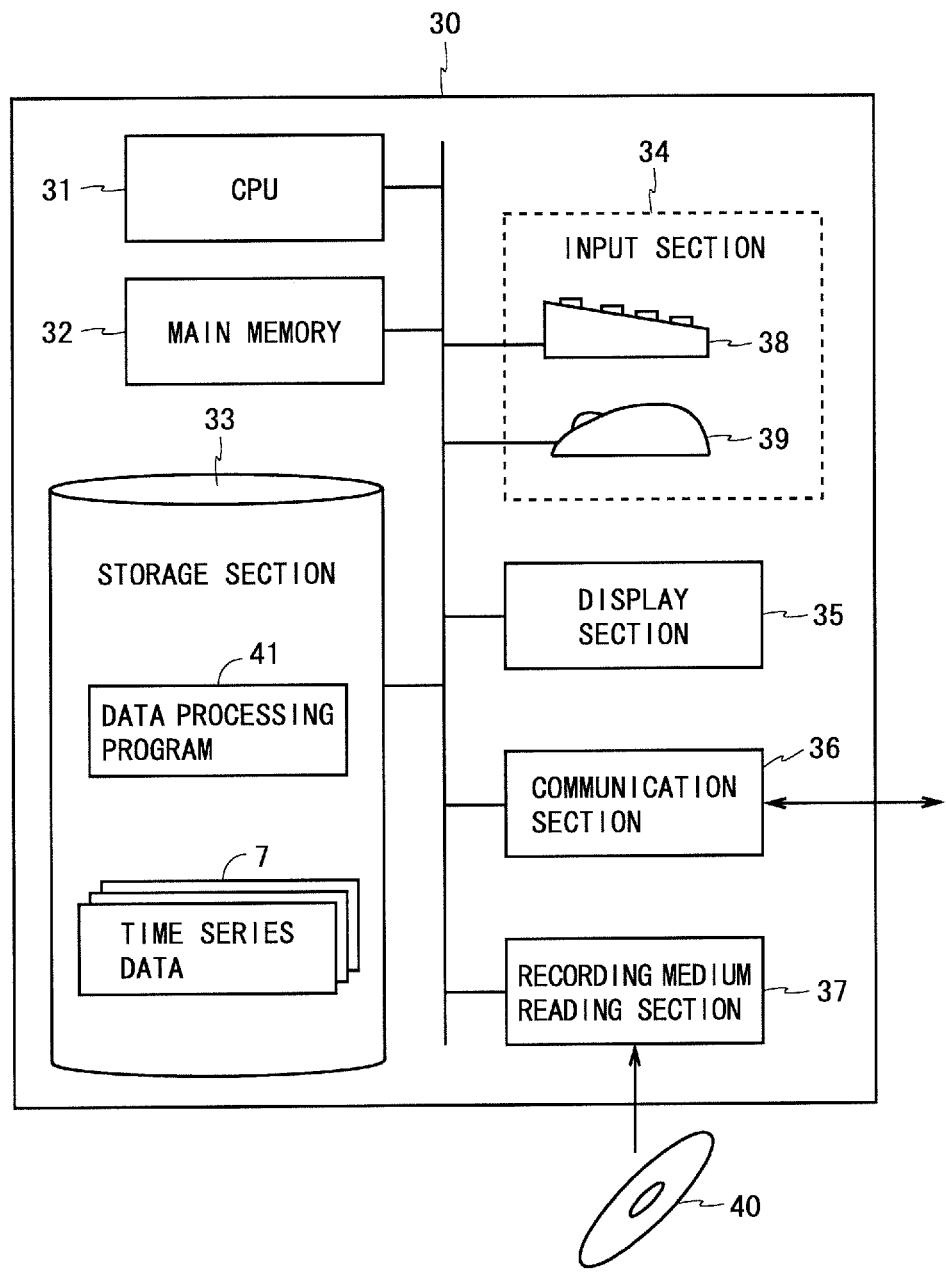
FIG. 4 is a block diagram showing a configuration example of a computer functioning as the data processing device shown in FIG. 1.

FIG. 4 is a block diagram showing a configuration example of a computer functioning as the data processing device 10. A computer 30 shown in FIG. 4 includes a CPU 31, a main memory 32, a storage section 33, an input section 34, a display section 35, a communication section 36, and a recording medium reading section 37. A DRAM is used for the main memory 32, for example. A hard disk is used for the storage section 33, for example. A keyboard 38 and a mouse 39 are included in the input section 34, for example. A liquid crystal display is used for the display section 35, for example. The communication section 36 is an interface circuit of cable communication or wireless communication. Communication with the substrate processing apparatus 20 is performed using the communication section 36. The recording medium reading section 37 is an interface circuit of a recording medium 40 having recorded thereon a program and the like. A non-transitory recording medium, such as a CD-ROM, is used for the recording medium 40, for example. Note that the configuration of the computer 30 described above is only an example, and the data processing device 10 can be configured using arbitrary computers.

In the following, a case in which the computer 30 functions as the data processing device 10 is described. In this case, the storage section 33 stores a data processing program 41 and the time series data 7. The time series data is received from the substrate processing apparatus 20 using the communication section 36. For example, the data processing program 41 may be received from a server or another computer using the communication section 36, or may be read out from the recording medium 40 using the recording medium reading section 37. When the data processing program 41 is to be executed, the data processing program 41 and the time series data 7 are copied and transferred to the main memory 32. The CPU 31 performs processing for setting three periods with respect to the time series data 7, processing for obtaining a score of the time series data 7, processing for displaying a screen based on the score, and the like, by executing the data processing program 41 stored in the main memory 32 using the main memory 32 as a work memory. At this time, the computer 30 functions as the data processing device 10.

Figure 5:
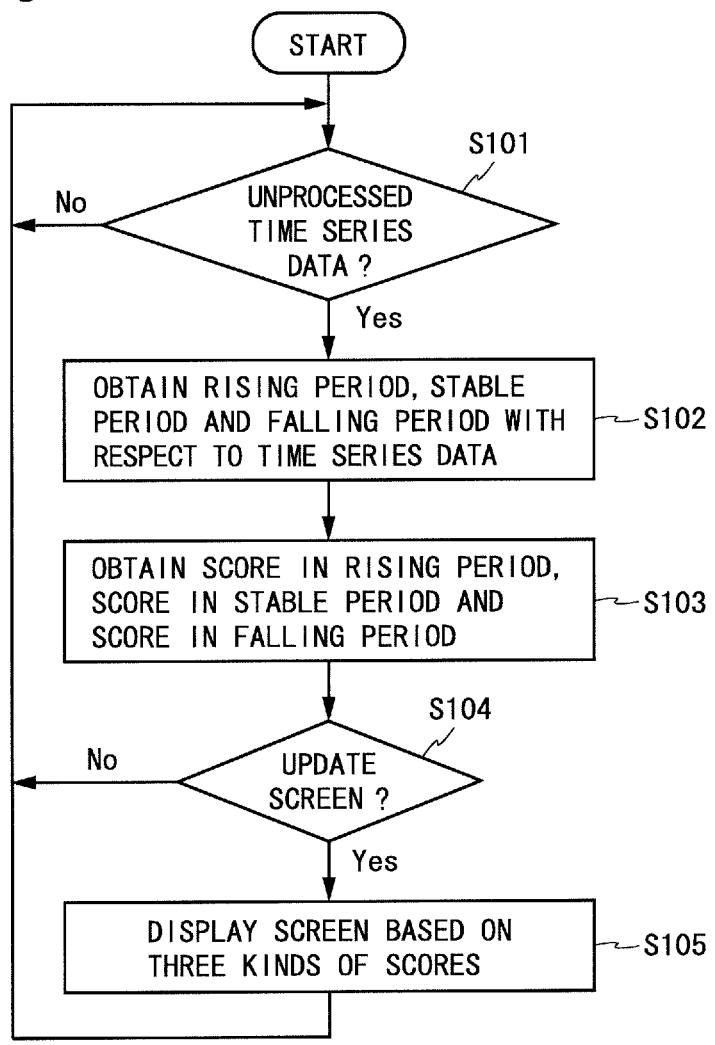
FIG. 5 is a flowchart showing an operation of the data processing device according to the first embodiment.

FIG. 5 is a flowchart showing an operation of the data processing device 10. Before the data processing device 10 starts the operation, the time series data 7 is stored in the data storage section 11. The data processing device 10 repeatedly executes steps S101 to S105 shown in FIG. 5.

As shown in FIG. 5, the period setting section 12 determines whether unprocessed time series data 7 exists, and goes to step S102 if Yes (step S101). If Yes in step S101, the period setting section 12 obtains a rising period, a stable period, and a falling period with respect to the unprocessed time series data 7 by a method described later (step S102). Next, the score calculation section 13 obtains a score of the time series data 7 (step S103). In step S103, the score calculation section 13 obtains a score in the rising period, a score in the stable period, and a score in the falling period as the score of the time series data 7.

Next, the result display section 14 determines whether to update a screen, goes to step S105 if Yes, and goes to step S101 if No (step S104). In step S104, the result display section 14 determines to update the screen when a new score is obtained in the score calculation section 13, or the like. If Yes in step S104, the result display section 14 displays a screen based on three kinds of scores obtained in step S103 (step S105). The screen displayed by the result display section 14 may be arbitrary so long as the screen is based on the scores obtained by the score calculation section 13. After executing step S105, control of the data processing device 10 goes to step S101.

Note that if Yes in step S104, a new score obtained by the score calculation section 13 may be stored in the storage section 33, in addition to making the result display section 14 display the screen. If configured like this, a screen based on the score obtained by the score calculation section 13 can be displayed later in the result display section 14 in accordance with a user's operation of the input section 34.

In the following, details of operations of the period setting section 12 and the score calculation section 13 are described. In the following description, process-target time series data 7 is referred to as X. It is assumed that the time series data X changes depending on a control signal C in the substrate processing apparatus 20.

Figure 6:
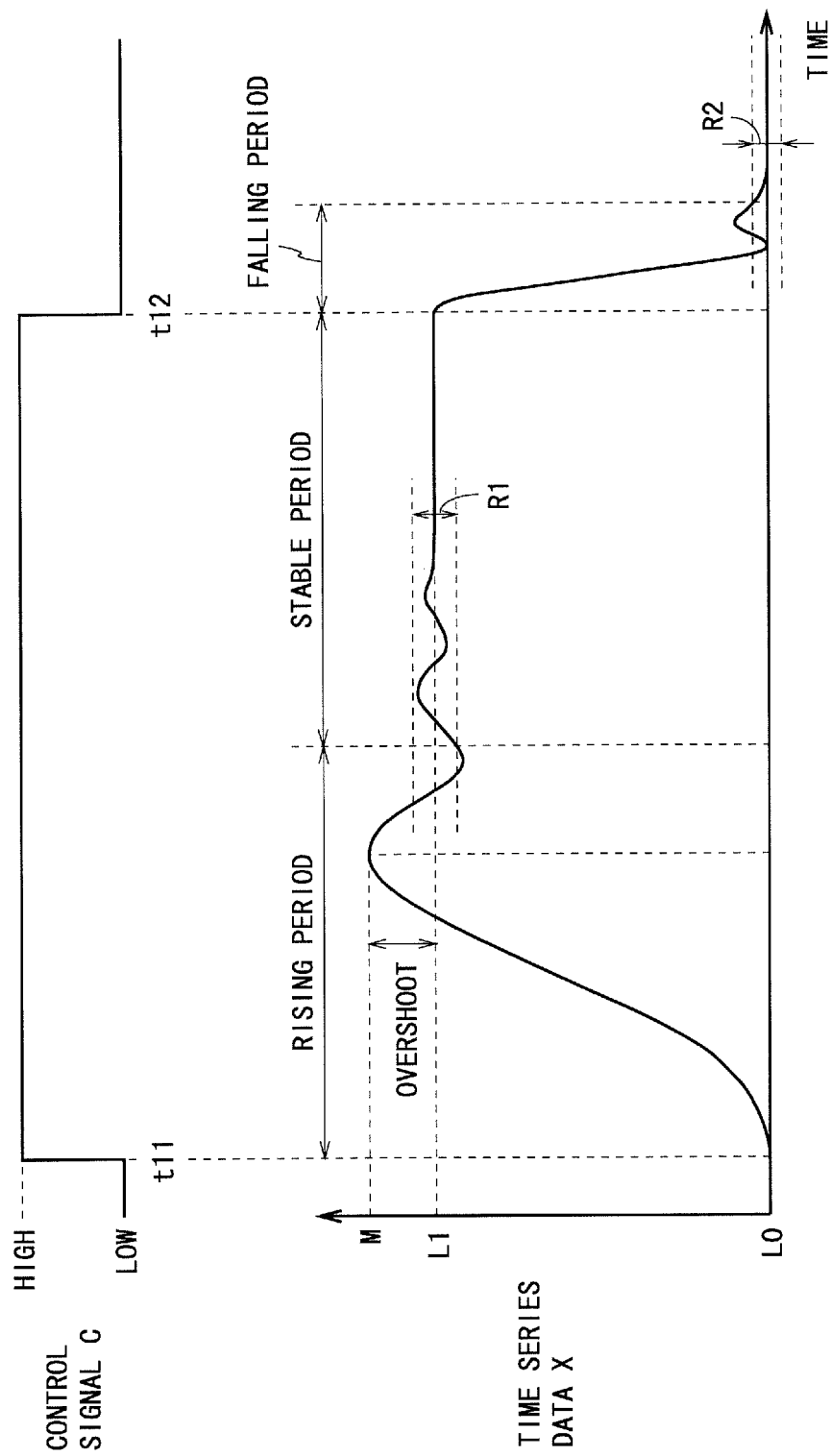
FIG. 6 is a diagram showing period setting in the data processing device shown in FIG. 1.

FIG. 6 is a diagram showing period setting in the data processing device 10. As shown in FIG. 6, the control signal C is in a low level in an initial state. The control signal C changes to a high level at time t11, and changes to the low level at time t12. The time series data X changes between an initial level L0 and a target level L1 (L0<L1) depending on the control signal C.

The time series data X has the initial level L0 in the initial state. When the control signal C changes at the time t11, the time series data X starts to rise from the initial level L0 to the target level L1. The time series data X falls after rising above the target level L1. The time series data X repeats rising and falling in a vicinity of the target level L1, and eventually stabilizes in the vicinity of the target level L1.

When the control signal C changes at the time t12, the time series data X starts to fall from the vicinity of the target level L1 to the initial level L0. The time series data X rises after falling to the initial level L0 or its vicinity. The time series data X repeats rising and falling in the vicinity of the initial level L0, and eventually stabilizes to the initial level L0.

A first range R1 including the target level L1 and a second range R2 including the initial level L0 are set to the time series data X. For example, a range of 90% to 110% of the target level L1 is set as the first range R1, and a range of −10% to 10% of the target level L1 is set as the second range R2. An upper limit and a lower limit of the first range R1 and an upper limit and a lower limit of the second range R2 are determined arbitrarily by the user.

The period setting section 12 obtains a period from when the control signal C changes until the time series data X falls within the first range R1 as a "rising period", obtains a period from when the control signal C changes until the time series data X falls within the second range R2 as a "falling period", and obtains a period between the rising period and the falling period as a "stable period". Note that "time series data falls within a range" means that the time series data does not take a value outside the range after that time point.

The score calculation section 13 obtains the score in the rising period, the score in the stable period, and the score in the falling period by a predetermined method. For example, the score calculation section 13 may obtain a length of the rising period as the score in the rising period, and may obtain a length of the falling period as the score in the falling period.

The score calculation section 13 may obtain an overshoot amount of the time series data X as the score in the rising period. When the target level of the time series data X is L1 and a maximum value of the time series data X is M, the score calculation section 13 obtains the overshoot amount V of the time series data 7 in accordance with a following equation (1). The score calculation section 13 may obtain the overshoot amount V of the time series data 7 in accordance with a following equation (2).

$$V=(M-L1)/L1\times 100 \quad (1)$$

$$V=M-L1 \quad (2)$$

The score calculation section 13 may obtain a statistical value of the time series data X in the stable period as the score in the stable period. For example, the score calculation section 13 obtains an average value, a median, or a variance of the time series data X in the stable period as the score in the stable period.

Figure 7:
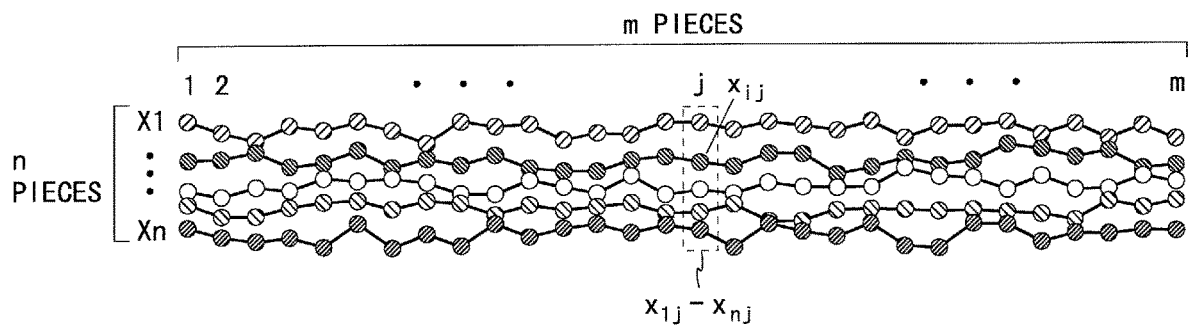
FIG. 7 is a diagram showing an example of a plurality of pieces of time series data.

The score calculation section 13 may obtain an unexpected value in the stable period as the score in the stable period using a plurality of pieces of time series data. FIG. 7 is a diagram showing an example of the plurality of pieces of time series data. It is assumed that each of the n pieces of the time series data X1, X2, . . . , Xn shown in FIG. 7 respectively includes m pieces of data. When i is an integer not smaller than 1 and not larger than n and j is an integer not smaller than 1 and not larger than m, j-th data included in time series data Xi is referred to as $x_{ij}$. In this case, the score calculation section 13 obtains a score Sp of the time series data Xp in accordance with following equations (3) to (6).

$$\mu_{pj} = \frac{1}{n-1} \sum_{i=1, i\neq p}^{n} x_{ij} \quad (3)$$

$$\mu_p = \frac{1}{(n-1)m} \sum_{i=1, i\neq p}^{n} \sum_{j=1}^{m} x_{ij} \quad (4)$$

$$\sigma_p^2 = \frac{1}{(n-1)m-1} \sum_{i=1, i\neq p}^{n} \sum_{j=1}^{m} (x_{ij} - \mu_p)^2 \quad (5)$$

$$S_p = \max_{1 \le j \le m} \left( \frac{|x_{pj} - \mu_{pj}|}{\sigma_p} \right) \quad (6)$$

Note that the value $\mu_{pj}$ obtained by the equation (3) is an average value of j-th data included in (n−1) pieces of time series data excluding the time series data Xp. The value $\mu_{pj}$ obtained by the equation (4) is an average value of all data included in the (n−1) pieces of time series data excluding the time series data Xp. The value $\sigma_p^2$ obtained by the equation (5) is a variance of the (n−1) pieces of time series data excluding the time series data Xp.

The score calculation section 13 has a threshold value of the score in the rising period, a threshold value of the score in the stable period, and a threshold value of the score in the falling period. The score calculation section 13 determines as "substrate is processed normally" when all of the scores are not larger than corresponding threshold values, and determines as "abnormality occurs in processing on substrate" when any of the scores exceeds the corresponding threshold value.

Alternatively, the score calculation section 13 may have only one threshold value of the score. In this case, the score calculation section 13 obtains a maximum value of the score in the rising period, the score in the stable period, and the score in the falling period, determines as "substrate is processed normally" when the obtained maximum value is not larger than the threshold value, and determines as "abnormality occurs in processing on substrate" when the obtained maximum value exceeds the threshold value.

Figure 8:
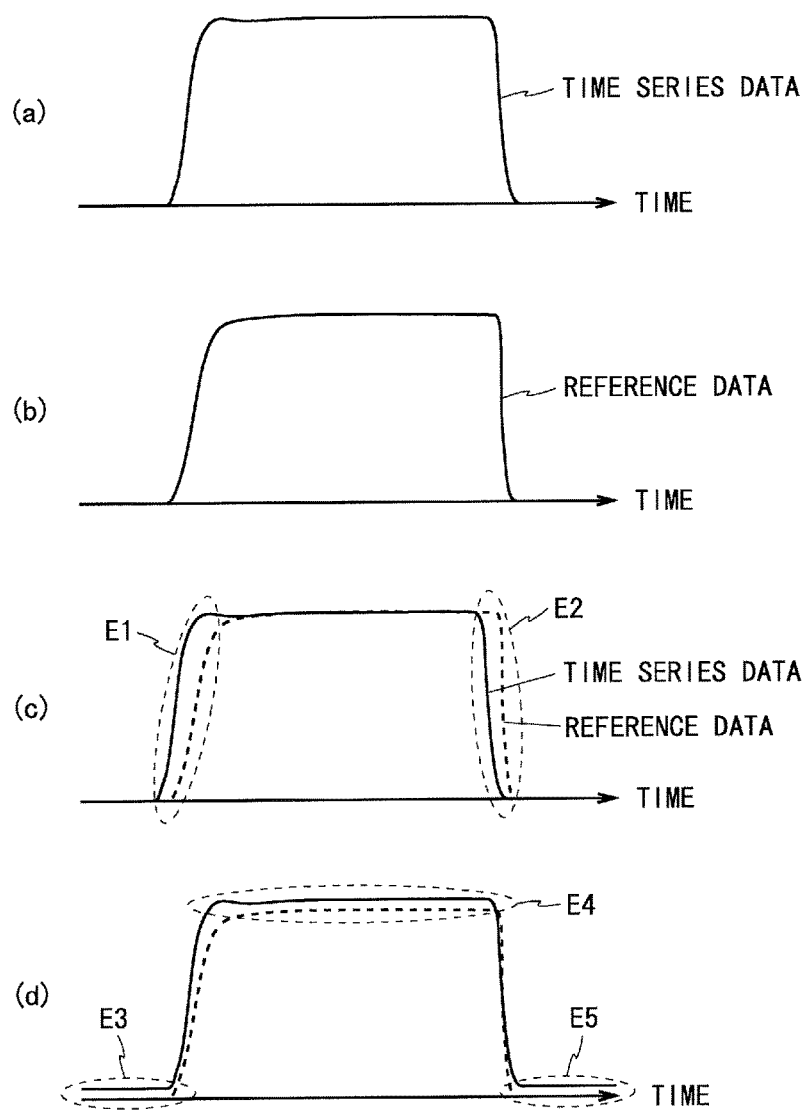
FIG. 8 is a diagram for explaining a problem of a conventional data processing method.

A problem of a conventional data processing method is described with reference to FIG. 8. In the following, an expected value data of the time series data is referred to as reference data. Consider a case where time series data shown in FIG. 8(a) is compared with reference data shown in FIG. 8(b). In the conventional data processing method, the time series data is compared with the reference data, and it is determined as "substrate is processed normally" when a difference between the both is not larger than a predetermined threshold value, and it is determined as "abnormality occurs in processing on substrate" when the difference between the both exceeds the threshold value.

However, when a shift in a time direction occurs between the time series data and the reference data, the difference between the time series data (shown in a solid line) and the reference data (shown in a broken line) becomes large in broken line portions E1, E2 shown in FIG. 8(c). Furthermore, when a difference of values occurs between the time series data and the reference data, the difference between the time series data and the reference data becomes large in broken line portions E3 to E5 shown in FIG. 8(d). Thus, the difference between the time series data and the reference data becomes larger than an assumed value. As a result, in cases shown in FIGS. 8(c) and (d), although it should be determined as "substrate is processed normally", it may be mistakenly determined as "abnormality occurs in processing on substrate".

On the other hand, the data processing device 10 according to the present embodiment obtains the rising period, the stable period, and the falling period with respect to the time series data 7, and obtains the evaluation values in the three periods as the evaluation value of the time series data 7. Therefore, according to the data processing device 10, whether the substrate is processed normally in the substrate processing apparatus 20 can be discriminated accurately based on the three kinds of evaluation values.

The data processing method according to the present embodiment includes a period setting step (S102) of setting, with respect to the time series data 7 obtained in the substrate processing apparatus 20, the rising period in which the time series data changes from the initial level L0 to the target level L1, the stable period in which the time series data keeps the target level L1, and the falling period in which the time series data changes from the target level L1 to the initial level L0, and an evaluation value calculation step (S103) of obtaining an evaluation value (score) of the time series data 7. In the evaluation value calculation step, the evaluation value in the rising period, the evaluation value in the stable period, and the evaluation value in the falling period are obtained as the evaluation value of the time series data 7. In this manner, the rising period, the stable period, and the falling period are obtained with respect to the time series data 7, and the evaluation values in the three periods are obtained as the evaluation value of the time series data. Therefore, whether the substrate is processed normally in the substrate processing apparatus 20 can be discriminated accurately based on the three kinds of evaluation values.

When the time series data X changes depending on the control signal C, in the period setting step, a period from when the control signal C changes until the time series data falls within the first range R1 including the target level L1 is obtained as the rising period, a period from when the control signal C changes until the time series data X falls within the second range R2 including the initial level L0 is obtained as the falling period, and a period between the rising period and the falling period is obtained as the stable period. Therefore, the rising period, the stable period, and the falling period can be determined suitably, and whether the substrate is processed normally in the substrate processing apparatus 20 can be discriminated accurately based on the three kinds of evaluation values.

In the evaluation value calculation step, the length of the rising period may be obtained as the evaluation value in the rising period, and the length of the falling period may be obtained as the evaluation value in the falling period. In this case, whether the substrate is processed normally in the substrate processing apparatus 20 can be discriminated accurately using the length of the rising period and the length of the falling period as the evaluation value. In the evaluation value calculation step, the overshoot amount of the time series data 7 may be obtained as the evaluation value in the rising period. In this case, whether the substrate is processed normally in the substrate processing apparatus 20 can be discriminated accurately using the overshoot amount of the time series data 7 as the evaluation value. In the evaluation value calculation step, the statistical value of the time series data 7 in the stable period may be obtained as the evaluation value in the stable period. In this case, whether the substrate is processed normally in the substrate processing apparatus 20 can be discriminated accurately using the statistical value of the time series data 7 in the stable period as the evaluation value.

The data processing device 10 and the data processing program 41 according to the present embodiment have features similar to those of the above-described data processing method and attain similar effects. According to the data processing method, the data processing device 10, and the data processing program 41 according to the present embodiment, whether the substrate is processed normally in the substrate processing apparatus 20 can be discriminated accurately based on the three kinds of evaluation values.

Note that the data processing device 10 according to the present embodiment may evaluate the broken line portions E1, E2 shown in FIG. 8(c) using the length of the rising period and the length of the falling period as the evaluation value, or may evaluate the broken line portion E4 shown in FIG. 8(d) using a difference between an average value of the time series data and an average value of the reference data in the stable period as the evaluation value.

In general, both a shift in the time direction and a difference of value occur between the time series data and the reference data. Furthermore, when a difference between the time series data and the reference data in the broken line portions E1, E2 shown in FIG. 8(c) and a difference between the time series data and the reference data in the broken line portions E3 to E5 shown in FIG. 8(d) are compared, the latter difference is likely to be larger. For example, even when a difference in a predetermined time between the time series data and the reference data in the broken line portion E4 is small, since an integrated value of the difference becomes large as a length of a period for integrating the difference becomes long, the latter difference is likely to be larger than the former difference. Thus, when the conventional data processing device uses a threshold value or the like with which the former difference can be correctly determined as normal or abnormal, the device may determine the latter difference which is so small to be judged as normal, as abnormal. Therefore, the conventional data processing device has a problem that it can not accurately determine whether normal or abnormal.

Contrary to this, the data processing device 10 according to the present embodiment obtains the rising period, the stable period, and the falling period with respect to the time series data 7, and obtains the evaluation values in the three periods as the evaluation value of the time series data 7. In particular, by evaluating the length of the rising period and the length of the falling period, it is possible to evaluate the difference between the time series data and the reference data only in the broken line portions E1, E2 without being affected by an influence of the difference between the time series data and the reference data in the broken line portions E3 to E5. Furthermore, by using a difference of the average value of the time series data and the average value of the reference data in the stable period as the evaluation value, the broken line portion E4 and other portions can be evaluated without being affected by an influence of the length of the periods, because the evaluation value does not become large even when a time of the broken line portion E4 is long.

Second Embodiment

Figure 9:
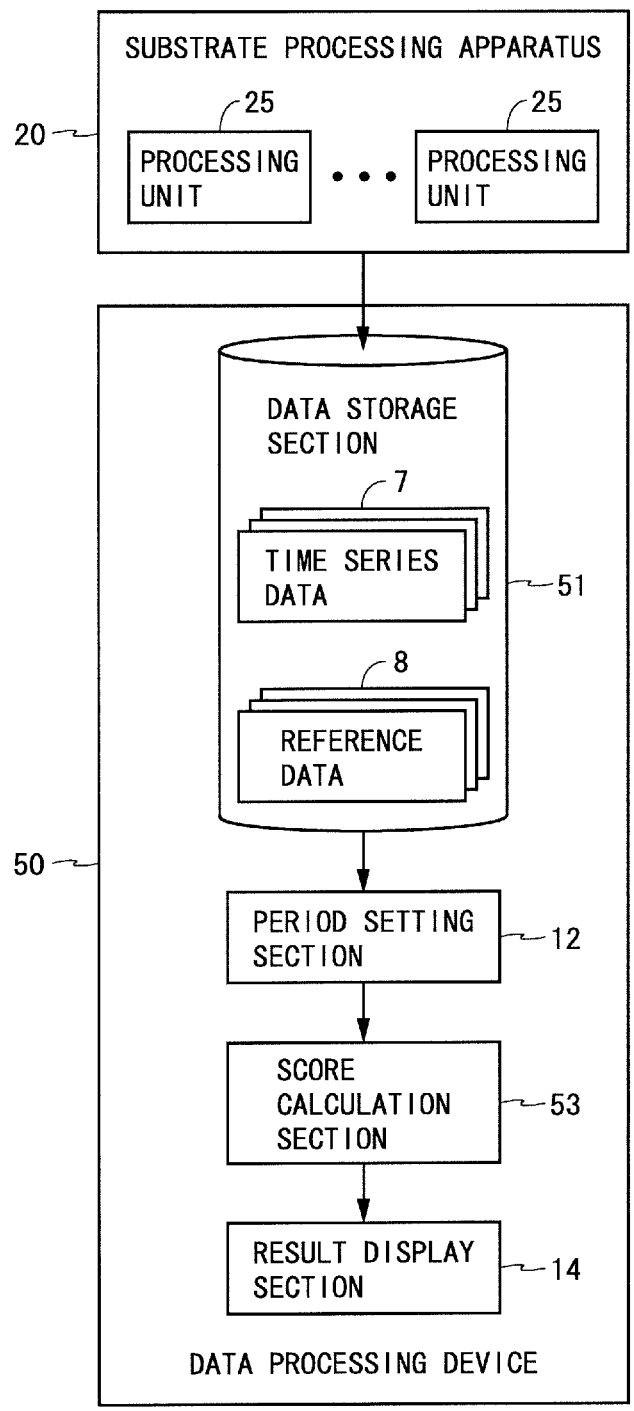
FIG. 9 is a block diagram showing a configuration of a data processing device according to a second embodiment of the present invention.

FIG. 9 is a block diagram showing a configuration of a data processing device according to a second embodiment of the present invention. A data processing device 50 shown in FIG. 9 includes a data storage section 51, the period setting section 12, a score calculation section 53, and the result display section 14. The score calculation section 53 obtains a score of the time series data 7 by a method different from that in the score calculation section 13 according to the first embodiment.

Figure 10:
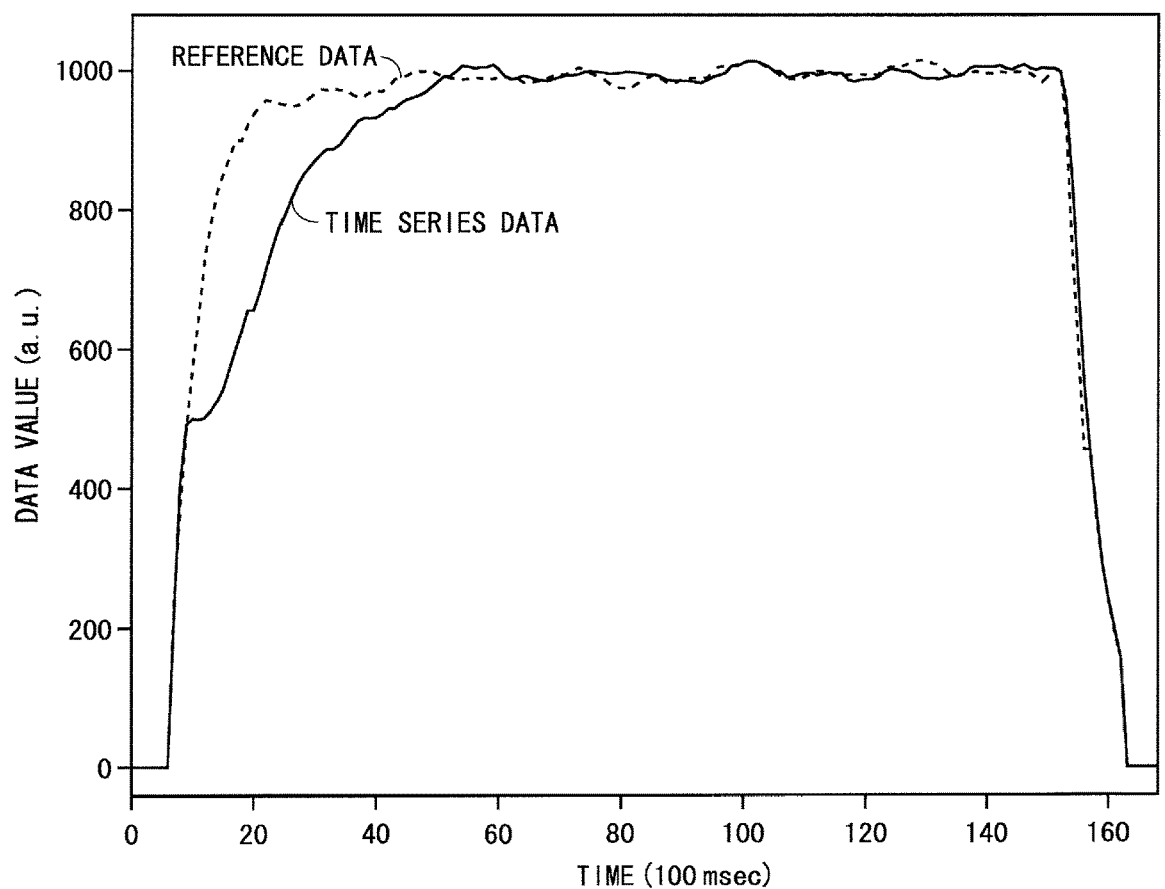
FIG. 10 is a diagram showing a graph of reference data in the data processing device shown in FIG. 9.

In addition to the time series data 7, the data storage section 51 stores reference data 8 which is expected value data of the time series data 7. For example, another time series data determined as optimal for the expected value data in a lot of time series data is used as the reference data 8. The reference data 8 may be selected from the time series data 7 stored in the storage section 33 by the user using the input section 34. When the reference data 8 corresponding to the time series data 7 shown in FIG. 3 is shown in a graph form, a graph shown in FIG. 10 as a broken line is obtained, for example. In an example shown in FIG. 10, the time series data 7 is behind the reference data 8 when rising.

The period setting section 12 obtains, with respect to the time series data X, the rising period in which the time series data X changes from the initial level L0 to the target level L1, the stable period in which the time series data X keeps the target level L1, and the falling period in which the time series data X changes from the target level L1 to the initial level L0 by a same method as that in the first embodiment.

The score calculation section 53 obtains the score in the rising period, the score in the stable period, and the score in the falling period as the score of the time series data 7, as with the score calculation section 13 according to the first embodiment. However, differently from the score calculation section 13, the score calculation section 53 obtains the above-described three kinds of scores by reading the time series data 7 with respect to which the three periods are obtained in the period setting section 12 and corresponding reference data 8, and comparing both.

Figure 11:
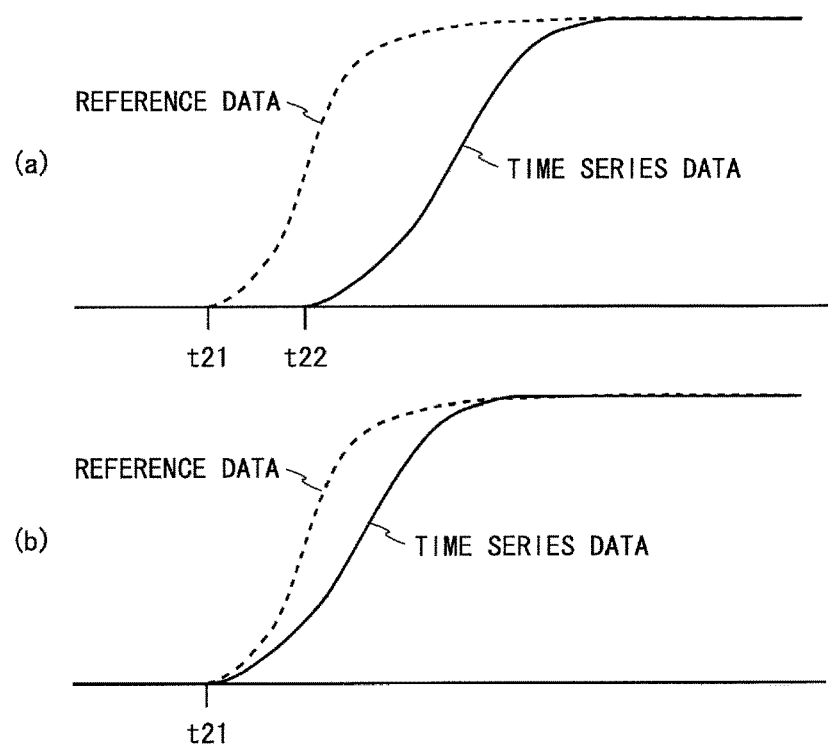
FIG. 11 is a diagram for explaining processing for matching change start timing in the data processing device shown in FIG. 9.

It is desirable that the score calculation section 53 compare the time series data 7 with the reference data 8 after matching timing at which data starts to change first between the time series data 7 and the reference data 8. For example, as shown in FIG. 11(a), consider a case in which the time series data 7 starts to change first at time t21 and the reference data 8 starts to change first at time t22, and the time t22 is behind the time t21. In this case, the score calculation section 53 matches the timing at which data starts to change first between the time series data 7 and the reference data 8, by moving the time series data 7 in an anterior direction of a time axis by time (t22-t21) (see FIG. 11(b)). The score calculation section 53 may move the reference data 8 in a posterior direction of the time axis by time (t22-t21). The score calculation section 53 obtains the score in the rising period, the score in the stable period, and the score in the falling period as the score of the time series data 7 by comparing the time series data 7 with the reference data 8 after that.

The score calculation section 13 may obtain an unexpected value in the stable period as the score in the stable period using the reference data 8. When the time series data X includes m pieces of data $x_j$ and the corresponding reference data Y includes m pieces of data $y_j$, the score calculation section 13 obtains a score S of the time series data X in accordance with a following equation (7).

$$S = \max_{1 \le j \le m} \left( \frac{|x_j - y_j|}{\sigma_y} \right) \quad (7)$$

In the equation (7), a value $\sigma_y$ is a variance of the reference data Y.

According to the data processing method according to the present embodiment, in the evaluation value calculation step (S103), the evaluation value (score) of the time series data 7 is obtained by comparing the time series data 7 with the reference data 8. Also by this method, the evaluation value of the time series data 7 can be obtained. In the evaluation value calculation step, the time series data 7 is compared with the reference data 8 after matching timing at which data starts to change first between the time series data 7 and the reference data 8. With this, a more suitable evaluation value with respect to the time series data 7 can be obtained. By using another time series data as the reference data 8, an evaluation value suitable for the time series data 7 can be obtained. The data processing device and the data processing program 41 according to the present embodiment have features similar to those of the above-described data processing method, and attain similar effects.

Third Embodiment

A data processing device according to a third embodiment has a same configuration as the data processing device according to the second embodiment (FIG. 9). In the data processing device according to this embodiment, the score calculation section 53 performs, a plurality of times, processing for moving one of the time series data 7 and the reference data 8 in a time axis direction by a predetermined amount and comparing the time series data 7 with the reference data 8. The score calculation section 53 obtains a minimum value of a plurality of obtained scores as the evaluation value of the time series data 7.

Figure 12:
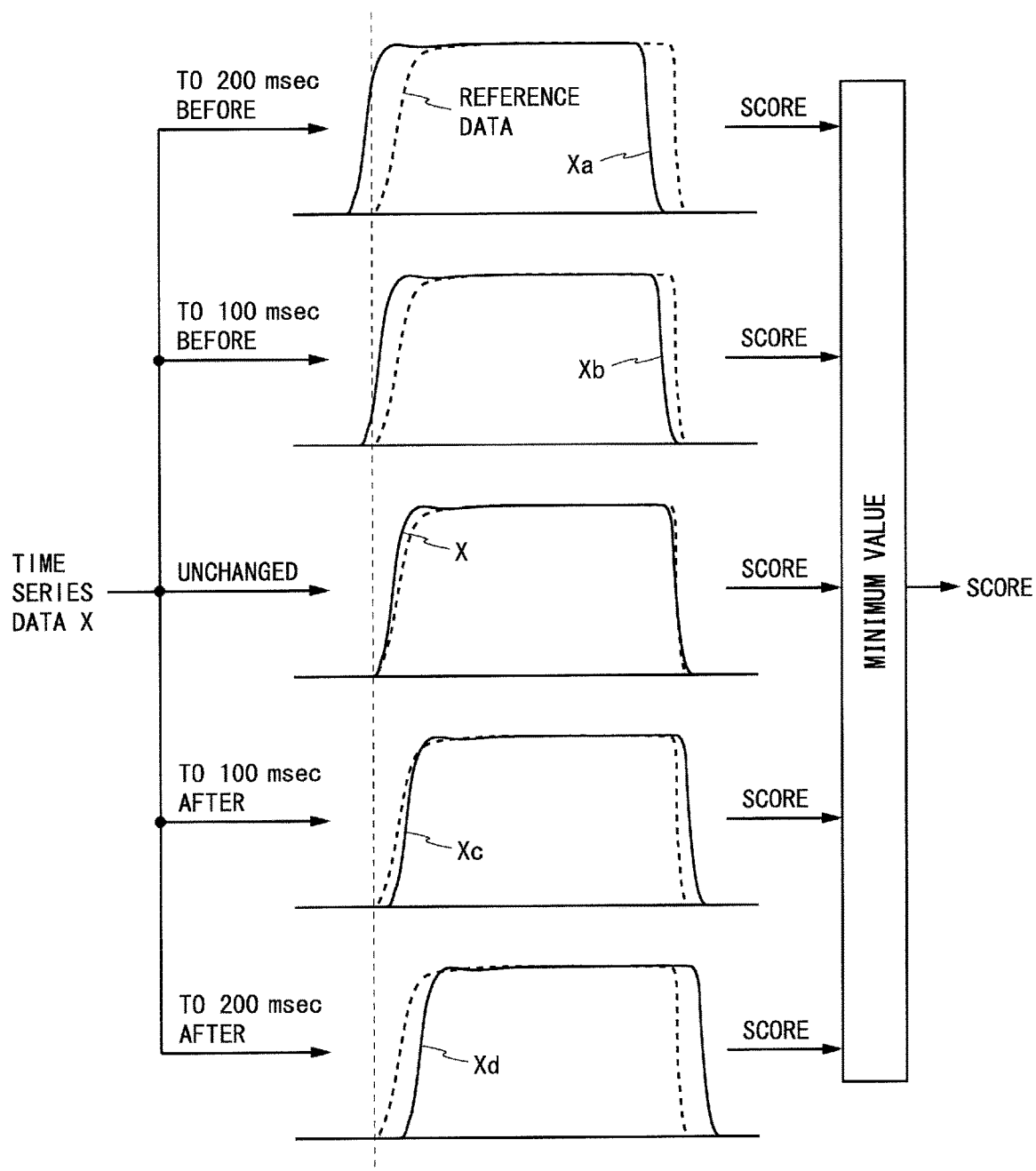
FIG. 12 is a diagram showing an operation of a score calculation section of a data processing device according to a third embodiment of the present invention.

FIG. 12 is a diagram showing an operation of the score calculation section 53 according to the present embodiment. As shown in FIG. 12, in addition to the process-target time series data X, the score calculation section 53 obtains data Xa by moving the time series data X in the anterior direction of the time axis by 200 msec (milliseconds), obtains data Xb by moving the time series data X in the anterior direction of the time axis by 100 msec, obtains data Xc by moving the time series data X in the posterior direction of the time axis by 100 msec, and obtains data Xd by moving the time series data X in the posterior direction of the time axis by 200 msec. The score calculation section 53 obtains five scores by comparing each of the above-described five pieces of data Xa, Xb, X, Xc, Xd with the reference data 8. The score calculation section 53 obtains a minimum value of the five scores as the score of the time series data 7.

Note that the score calculation section 53 may move the time series data 7 in the time axis direction by a predetermined amount or may move the reference data 8 in the time axis direction by a predetermined amount, before comparing the time series data 7 with the reference data 8.

According to the data processing method according to the present embodiment, in the evaluation value calculation step (S103), processing for moving one of the time series data 7 and the reference data 8 in the time axis direction by a predetermined amount and comparing the time series data 7 with the reference data 8 is performed a plurality of times, and a minimum value of a plurality of obtained evaluation values (scores) is obtained as the evaluation value of the time series data 7. A more suitable evaluation value for the time series data 7 can be obtained by comparing the time series data 7 with the reference data 8 with moving one of the data in the time axis direction. The data processing device 50 and the data processing program 41 according to the present embodiment have features similar to those of the above-described data processing method, and attain similar effects.

Fourth Embodiment

A data processing device according to a fourth embodiment has a same configuration as the data processing device according to the first embodiment (FIG. 1) or the data processing device according to the second embodiment (FIG. 9). A case in which the time series data 7 has a plurality of target levels is described in the present embodiment.

When the time series data 7 has a plurality of target levels, the period setting section 12 obtains, with respect to the time series data 7, a transition period in which the time series data changes from an old target level to a new target level, in addition to the rising period, the stable period, and the falling period. The score calculation section 13 (or the score calculation section 53) obtains a score in the transition period as the evaluation value of the time series data 7 in addition to the score in the rising period, the score in the stable period, and the score in the falling period.

In the following description, it is assumed that processing-target time series data 7 changes depending on control signals C, C2 in the substrate processing apparatus 20. FIG. 13 is a diagram showing a period setting in the data processing device according to the present embodiment. As shown in FIG. 13, the control signal C is in the low level in an initial state. The control signal C changes to the high level at time t31, and changes to the low level at time t33. The control signal C2 has a level CL0 in the initial state. The control signal C2 changes to a level CL1 at the time t31, changes to a level CL2 at time t32, and changes to the level CL0 at the time t33.

The time series data X has an initial level L0 in the initial state. When the control signal C changes at the time t31, the time series data X starts to rise from the initial level L0 to a first target level L1. The time series data X falls after rising over the first target level L1. The time series data X repeats rising and falling in a vicinity of the first target level L1, and eventually stabilizes in the vicinity of the first target level L1.

When the control signal C2 changes at the time t32, the time series data X starts to rise from the vicinity of the first target level L1 to a second target level L2. The time series data X rises after once falling immediately after the time t32, and falls after rising over the second target level L2. The time series data X repeats rising and falling in a vicinity of the second target level L2, and eventually stabilizes in the vicinity of the second target level L2.

When the control signal C changes at the time t33, the time series data X starts to fall from the vicinity of the second target level L2 to the initial level L0. The time series data X rises after falling to the initial level L0 or its vicinity. The time series data X repeats rising and falling in the vicinity of the initial level L0, and eventually stabilizes to the initial level L0.

In addition to the first range including the first target level L1 and the second range including the initial level L0, a third range including the second target level L2 is set to the time series data X. As with the first embodiment, the period setting section 12 obtains a period from when the control signal C changes until the time series data X falls within the first range as a "rising period", and obtains a period from when the control signal C changes until the time series data X falls within the second range as a "falling period". In addition, the period setting section 12 obtains a period from when the control signal C2 changes until the time series data X falls within the third range as a "transition period", obtains a period between the rising period and the transition period as a "first stable period", and obtains a period between the transition period and the falling period as a "second stable period".

The score calculation section 53 obtains a score in the transition period, in addition to the score in the rising period, the score in the first stable period, the score in the second stable period, and the score in the falling period. For example, the score calculation section 53 may obtain a length of the transition period as the score in the transition period.

In the data processing method according to the present embodiment, when the time series data 7 has a plurality of target levels, in the period setting step (S102), the transition period in which the time series data 7 changes from an old target level to a new target level is further obtained. In the evaluation value calculation step (S103), an evaluation value (score) in the transition period is further obtained as the evaluation value of the time series data 7. According to the data processing method according to the present embodiment, when the time series data 7 has the plurality of target levels, whether the substrate is processed normally in the substrate processing apparatus 20 can be accurately discriminated by obtaining the evaluation value in the transition period in addition to the three kinds of evaluation values. The data processing devices 10, 50 and the data processing program 41 according to the present embodiment have features similar to those of the above-described data processing method, and attain similar effects.

Although the present invention is described in detail in the above, the above description is exemplary in all of the aspects and is not restrictive. It is understood that various other changes and modification can be derived without going out of the present invention.

This application claims a priority based on Japanese Patent Application No. 2018-20796 filed on Feb. 8, 2018, and entitled "Data Processing Method, Data Processing Device, And Data Processing Program", which is incorporated herein by reference in its entirety.

What is claimed is:

1. A data processing method for processing time series data with a data processor, the time series data being obtained by measuring a flow rate of a processing fluid during operation of a cleaning processing unit contained in a substrate cleaning processing apparatus, the method comprising:
a period setting step of obtaining, with respect to a flow rate data of a processing fluid in the cleaning unit among the time series data, a rising period in which the time series data changes from an initial level to a target level, a stable period in which the time series data keeps the target level, and a falling period in which the time series data changes from the target level to the initial level,
an evaluation value calculation step of obtaining an evaluation value of the time series data,
an evaluation value determination step of determining whether or not the substrate has been processed normally in the cleaning processing unit based on the evaluation value of the time series data, and
generating an output signal with the data processor, based on the evaluation value of the time series data, to operate a device operatively connected to the data processor, wherein
the time series data changes according to a control signal of the cleaning processing unit, and
in the evaluation value calculation step, an evaluation value in the rising period, an evaluation value in the stable period, and an evaluation value in the falling period are obtained as the evaluation value of the time series data.

2. The data processing method according to claim 1, wherein
in the period setting step, a period from when the control signal changes until the time series data falls within a first range including the target level is obtained as the rising period, a period from when the control signal changes until the time series data falls within a second range including the initial level is obtained as the falling period, and a period between the rising period and the falling period is obtained as the stable period.

3. The data processing method according to claim 2, wherein in the evaluation value calculation step, a length of the rising period is obtained as the evaluation value in the rising period, and a length of the falling period is obtained as the evaluation value in the falling period.

4. The data processing method according to claim 2, wherein in the evaluation value calculation step, an overshoot amount of the time series data is obtained as the evaluation value in the rising period.

5. The data processing method according to claim 2, wherein in the evaluation value calculation step, a statistical value of the time series data in the stable period is obtained as the evaluation value in the stable period.

6. The data processing method according to claim 2, wherein in the evaluation value calculation step, the evaluation value of the time series data is obtained by comparing the time series data with reference data.

7. The data processing method according to claim 6, wherein in the evaluation value calculation step, the time series data is compared with the reference data after matching timing at which data starts to change first between the time series data and the reference data.

8. The data processing method according to claim 6, wherein the reference data is another time series data.

9. The data processing method according to claim 6, wherein in the evaluation value calculation step, processing for moving one of the time series data and the reference data in a time axis direction by a predetermined amount and comparing the time series data with the reference data is performed a plurality of times, and a minimum value of a plurality of obtained evaluation values is obtained as the evaluation value of the time series data.

10. The data processing method according to claim 2, wherein
when the time series data has a plurality of target levels, in the period setting step, a transition period in which the time series data changes from an old target level to a new target level is further obtained, and
in the evaluation value calculation step, an evaluation value in the transition period is further obtained as the evaluation value of the time series data.

11. A data processing device for processing time series data with a data processor, the time series data being obtained by measuring a flow rate of a processing fluid during operation of a cleaning processing unit contained in a substrate cleaning processing apparatus, the device comprising:
a period setting section configured to obtain, with respect to a flow rate data of a processing fluid in the cleaning processing unit among the time series data, a rising period in which the time series data changes from an initial level to a target level, a stable period in which the time series data keeps the target level, and a falling period in which the time series data changes from the target level to the initial level,
an evaluation value calculation section configured to obtain an evaluation value of the time series data, and
an evaluation value determination section configured to determine whether or not the substrate has been processed normally in the cleaning processing unit based on the evaluation value of the time series data,
wherein the data processor is configured to generate an output signal, based on the evaluation value of the time series data, to operate a device operatively connected to the data processor,
wherein the time series data changes according to a control signal of the cleaning processing unit, and
wherein the evaluation value calculation section obtains an evaluation value in the rising period, an evaluation value in the stable period, and an evaluation value in the falling period as the evaluation value of the time series data.

12. The data processing device according to claim 11, wherein
the period setting section obtains a period from when the control signal changes until the time series data falls within a first range including the target level as the rising period, obtains a period from when the control signal changes until the time series data falls within a second range including the initial level as the falling period, and obtains a period between the rising period and the falling period as the stable period.

13. The data processing device according to claim 12, wherein the evaluation value calculation section obtains a length of the rising period as the evaluation value in the rising period, and obtains a length of the falling period as the evaluation value in the falling period.

14. The data processing device according to claim 12, wherein the evaluation value calculation section obtains an overshoot amount of the time series data as the evaluation value in the rising period.

15. The data processing device according to claim 12, wherein the evaluation value calculation section obtains a statistical value of the time series data in the stable period as the evaluation value in the stable period.

16. The data processing device according to claim 12, wherein the evaluation value calculation section obtains the evaluation value of the time series data by comparing the time series data with reference data.

17. The data processing device according to claim 16, wherein the evaluation value calculation section compares the time series data with the reference data after matching timing at which data starts to change first between the time series data and the reference data.

18. The data processing device according to claim 16, wherein the evaluation value calculation section performs, a plurality of times, processing for moving one of the time series data and the reference data in a time axis direction by a predetermined amount and comparing the time series data with the reference data, and obtains a minimum value of a plurality of obtained evaluation values as the evaluation value of the time series data.

19. The data processing device according to claim 12, wherein
when the time series data has a plurality of target levels, the period setting section further obtains a transition period in which the time series data changes from an old target level to a new target level, and
the evaluation value calculation section further obtains an evaluation value in the transition period as the evaluation value of the time series data.

20. A non-transitory computer-readable recording medium having recorded thereon a data processing program for processing time series data with a data processor, the time series data being obtained by measuring a flow rate of a processing fluid during operation of a cleaning processing unit contained in a substrate cleaning processing apparatus, the data processing program causing a computer to execute a method by a CPU using a memory, the method comprising:
a period setting step of obtaining, with respect to a flow rate data of the processing fluid contained in a substrate cleaning processing apparatus among the time series data, a rising period in which the time series data changes from an initial level to a target level, a stable period in which the time series data keeps the target level, and a falling period in which the time series data changes from the target level to the initial level,
an evaluation value calculation step of obtaining an evaluation value of the time series data,
an evaluation value determination step of determining whether or not the substrate has been processed normally in the cleaning processing unit based on the evaluation value of the time series data, and
generating an output signal with the data processor, based on the evaluation value of the time series data, to operate a device operatively connected to the data processor, wherein the time series data changes according to a control signal of the cleaning processing unit, and in the evaluation value calculation step, an evaluation value in the rising period, an evaluation value in the stable period, and an evaluation value in the falling period are obtained as the evaluation value of the time series data.

* * * * *